& Company

United States Patent [19]
Floessel et al.

[11] 3,916,081
[45] Oct. 28, 1975

[54] MULTI-PHASE TUBE ENCLOSED PRESSURE GAS INSULATED ELECTRICAL CABLE

[75] Inventors: Carl Dieter Floessel, Fislisbach; Klaus Floessel, Wettingen, both of Switzerland

[73] Assignee: BBC Brown Boveri & Company Limited, Baden, Switzerland

[22] Filed: Nov. 19, 1974

[21] Appl. No.: 525,314

[30] Foreign Application Priority Data
Nov. 28, 1973  Switzerland.................... 16685/73

[52] U.S. Cl. .................. 174/28; 138/113; 248/55
[51] Int. Cl.² ........................................... H01B 9/06
[58] Field of Search...... 174/27, 28, 16 B, 10, 99 R, 174/99 B; 138/108, 112, 113, 114; 248/55

[56] References Cited
UNITED STATES PATENTS

| | | | |
|---|---|---|---|
| 2,191,071 | 2/1940 | Duttera................................ | 174/28 |
| 2,706,496 | 4/1955 | Bond.................................. | 248/55 X |
| 3,169,576 | 2/1965 | Lee et al........................ | 138/113 X |
| 3,361,870 | 1/1968 | Whitehead......................... | 174/99 B |
| 3,379,027 | 4/1968 | Mowell et al..................... | 138/113 X |
| 3,725,567 | 4/1973 | Olsen et al......................... | 174/28 X |
| 3,730,968 | 5/1973 | Szente-Varga................. | 174/99 B X |
| 3,758,701 | 9/1973 | Schmidt............................. | 138/113 X |
| 3,786,379 | 1/1974 | Lutchansky..................... | 138/113 X |

*Primary Examiner*—Arthur T. Grimley
*Attorney, Agent, or Firm*—Pierce, Scheffler & Parker

[57] ABSTRACT

A tube-enclosed pressure-gas insulated electrical cable comprises a three-phase conductor structure located within a common gas-filled tubular enclosure and supported by means of longitudinally spaced carrier rings within which the phase conductors are mounted in spaced relation by pin type insulators. In order to permit the conductor-carrier ring assembly to be installed by sliding it into the tube, each carrier ring is provided with three slidable members located in uniformly spaced relation about the periphery of the ring, the slidable members consisting of leaf springs secured at their mid points to the ring and the ends of the springs being provided with rollers which establish a rolling spring loaded contact with the inner surface of the tube.

9 Claims, 5 Drawing Figures

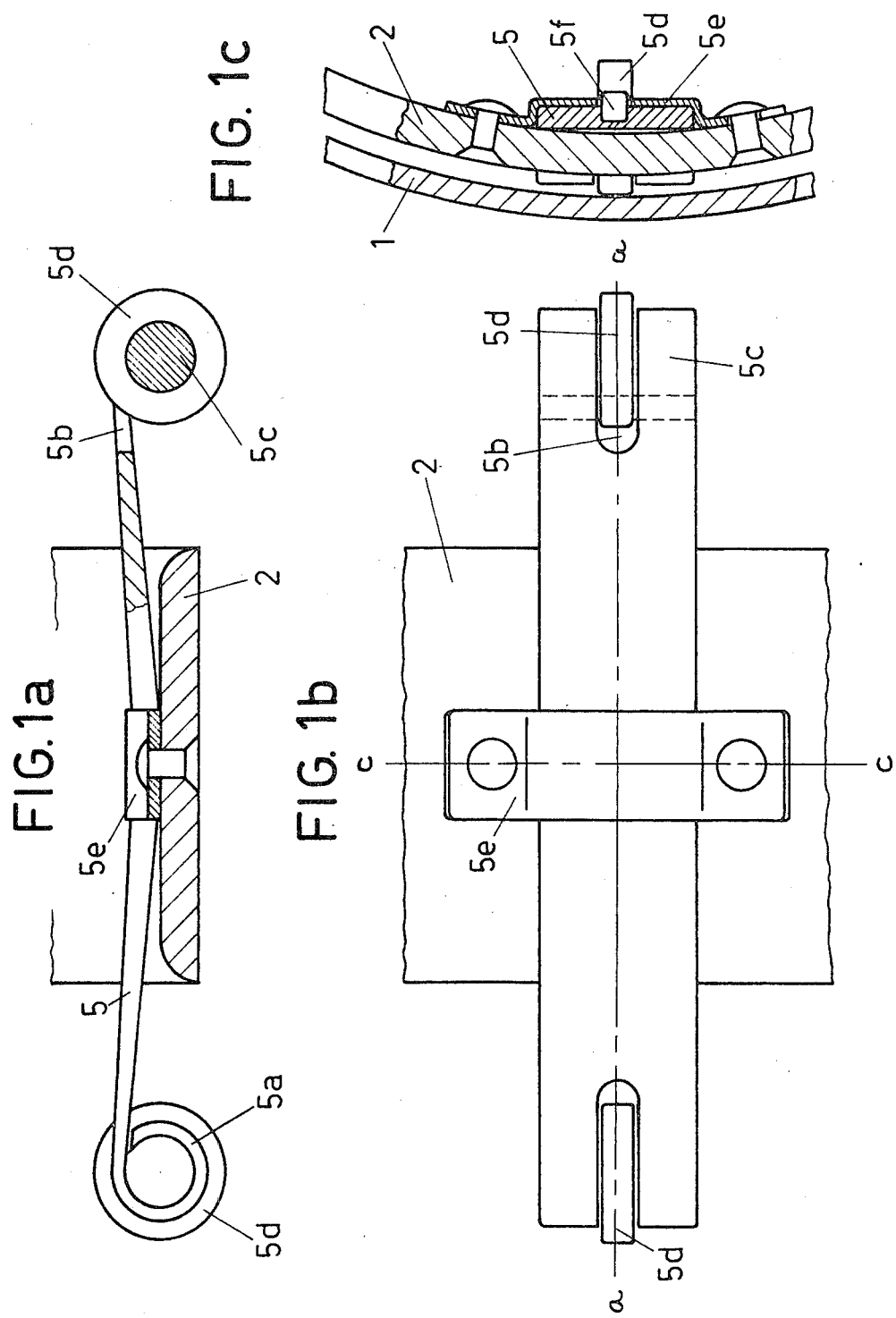

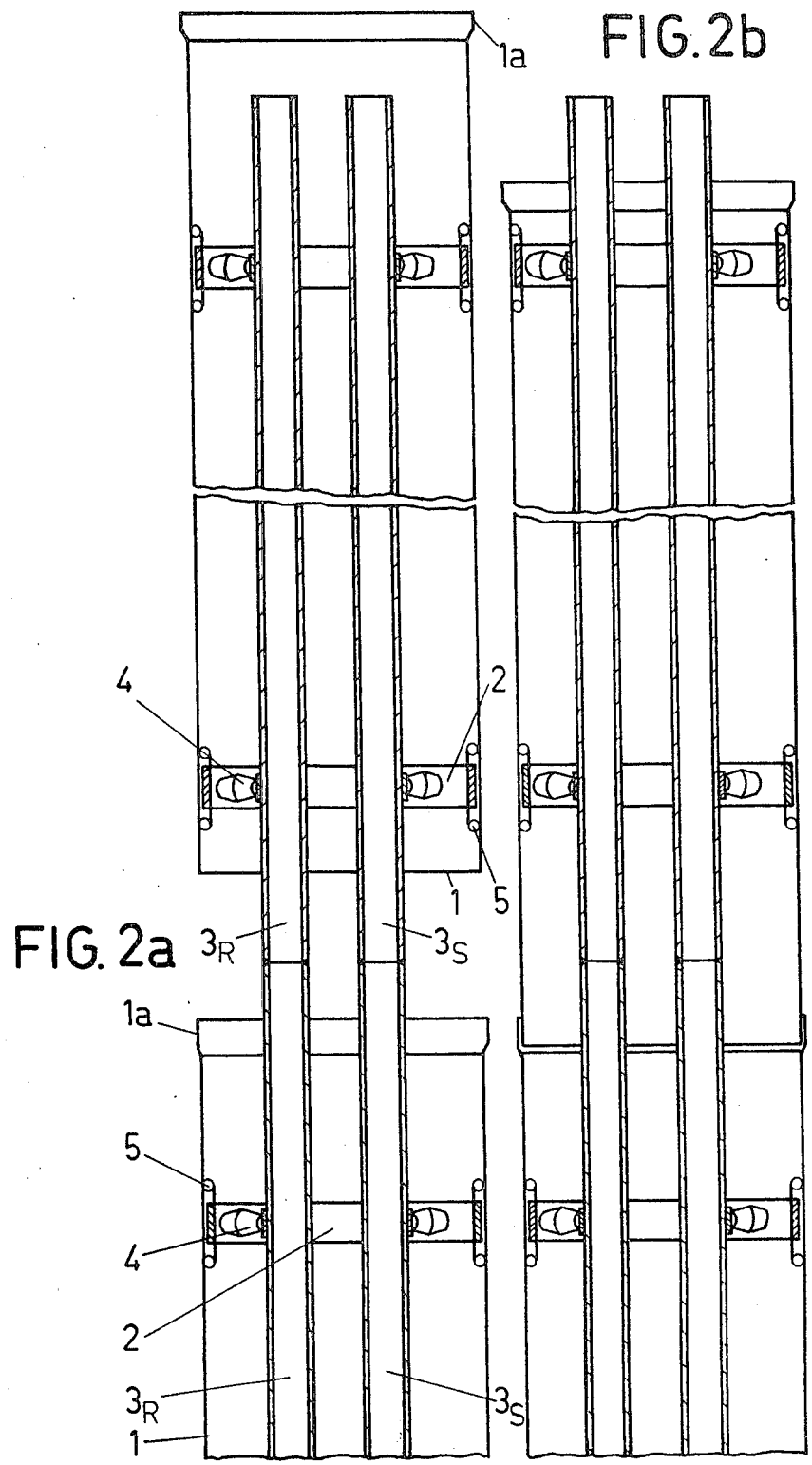

MULTI-PHASE TUBE ENCLOSED PRESSURE GAS INSULATED ELECTRICAL CABLE

This invention relates to an improvement in a tube-enclosed pressure-gas insulated electrical cable with at least one electrical conductor contained within a cylindrical tube, the conductor(s) being supported at longitudinal intervals within the tube by means of insulators which are secured to carrier rings that are provided with radially protruding means by which the assembly of the conductor(s) and the carrier rings may be installed in the tube by sliding it along the inner surface of the tube. The space between the conductor(s) and the encasing tube is filled with insulating gas, e.g. $SF_6$ at a pressure of 4 ata.

There is known, as disclosed in Swiss Pat. No. 524,907, a tube-enclosed pressure-gas insulated electrical cable of the three-phase type wherein the carrier rings for the three phase conductors are provided with three slidable elements in the form of skids spaced uniformly about the circumference of the ring. However, this known arrangement has the disadvantage that a relatively large amount of play must exist between the skids and the inner surface of the enclosing tube in order to make it practical for purposes of handling. Thus, when three such skids are utilized, these having a mutual spacing of 120°, at most only two of the skids will rest, at any one time, against the inner surface of the enclosing tube. Thus, in the event of an occurrence of greater than normal currents in the conductors e.g. those having short-circuit magnitude, very high mutually repellant electro-dynamic forces are created between the phase conductors which can lead to the possibility of destruction or at least deformation of the carrier rings because these rings cannot find a symmetrical and uniform back-up support against the inner surface of the enclosing tube which itself is quite rigid and usually grounded.

The primary object of the present invention is to provide an improved construction for the carrier ring-conductor assembly which overcomes this disadvantage and this objective is attained by constructing the slidable elements mounted on the carrier rings in the form of leaf springs each provided with roller means and all of which are spring pressed at all times against and roll on the interior surface of the enclosing tube. Preferably the leaf springs are secured to the support rings at their center and roller means are provided at each end of the spring. The improved construction for the slidable elements thus improves the resistance to unfavorable influence by shortcircuit currents should they arise in the conductor(s) without impairing practical handling of the carrier ring-conductor(s) assembly during initial installation within the enclosing tube or thereafter for purposes of inspection.

A preferred embodiment of the invention as applied to a multi-phase cable structure will now be described in detail and is illustrated in the accompanying drawings wherein:

FIG. 1a is a view of one of the improved leaf spring structures, three of which are secured to the carrier ring in mutually spaced relation around its periphery, the view being partly in elevation and partly in section and taken on line a—a of FIG. 1b;

FIG. 1b is a plan view of the leaf spring structure shown in FIG. 1a;

FIG. 1c is a sectional view through the center of the leaf spring structure and taken on line c—c of FIG. 1b;

FIG. 2a is a longitudinal view showing two longitudinal sections of the tube enclosed three-phase cable structure during an assembly operation; and FIG. 2b is a view similar to FIG. 2a but after the longitudinal sections of the cable have been completely assembled.

With reference now to the drawings, an arcuate section of the enclosing metallic and usually grounded tube is indicated at 1. Placed within the tube, as shown in FIGS. 2a–2b, at longitudinally spaced intervals are carrier rings 2 within which the phase conductors are supported by means of pin-type insulators 4. One suitable type of pin insulator support structure for the three phase conductors is disclosed in my co-pending U.S. patent application Ser. No. 515,157, filed Oct. 16, 1974, and which is based upon a corresponding application, Ser. No. 16033/73 filed in Switzerland on Nov. 14, 1973. In FIGS. 2a, 2b, however, only two of the three phase conductors can be seen due to the way in which the views are taken. These are conductors 3R and 3S. The other phase conductor 3T is not seen.

As indicated in FIGS. 2a and 2b, each of the carrier rings 2 is provided with a plurality of slidable elements in the form of leaf springs 5 which are uniformly spaced around the periphery of the ring. Three such springs — with a mutual spacing of 120° — can be used and two of these are shown in FIGS 2a, 2b. The third spring cannot be seen due to the way in which the section is taken. The structural details of one of the springs are shown in FIGS. 1a to 1c. Here it will be seen that each leaf spring 5 is secured at its center to the inner side of the carrier ring 2 by means including a clamp 5e including a yoke portion which encloses the body of the leaf spring and also including two ears which are secured to the carrier ring 2 by riveting. The spring 5 is retained against longitudinal displacement within the clamp 5e by means of a retaining pin 5f.

The end portions of the leaf spring 5 project beyond the sides of the carrier ring 2 and are rolled over to form a bearing into which an axle 5c is press-fitted and a roller 5d is mounted on the axle for rotation within a slotted portion 5b of the leaf spring provided at the bearing area. The two rollers 5d provided on each leaf spring 5 are thus spring-pressed against the inner surface of the enclosing tube 1 and provide a symmetrical back-up against the inner surface of the tube for symmetrically countering any electro-dynamic forces created between the phase conductors in the event that a short-circuit condition arises.

The rollers 5d provided on each leaf spring 5 also establish a substantially friction-free rolling contact with the inner surface of the enclosing tube 1 which also facilitates installation of the sub-assembly of the phase conductors and carrier rings into the tubes. From FIGS. 2a, 2b it will be seen that the enclosing tube 1 and phase conductors are sectionalized longitudinally into lengths which are then joined together. In FIG. 2a, the end portions of two such lengths of the enclosing tube are shown in a spaced-apart relation at an intermediate stage of the cable assembly, the end of one tube being plaincylindrical and the adjoining end of the adjacent tube being provided with an enlarged sleeve portion 1a into which the end of the other tube section is inserted and sealed tight by welding. In FIG. 2a, the ends of the phase conductors of the two cable sections are shown in abutment and have been secured together. After the conductor joints have been made, relative longitudinal displacement is effected between the conductor carrier ring assemblies and the enclosing tube sections 1 thus resulting in the final assembly as depicted in FIG. 2b.

We claim:

1. A tube-enclosed pressure-gas insulated electrical cable comprising a gas-filled rigid tube, at least one electrical conductor extending longitudinally within said tube, said conductor being supported by insulator means within a plurality of longitudinally spaced carrier rings thereby to establish a separate conductor-carrier ring assembly, and each said carrier ring being provided with at least three slidable members located in uniformly spaced relation about the periphery of said ring thereby to enable the conductor-carrier ring assembly to be slidably installed within said tube, each said slidable member being constituted by a leaf spring secured to said carrier ring and provided with at least one roller for establishing a rolling spring-loaded contact with the inner surface of said tube.

2. A tube-enclosed pressure-gas insulated electrical cable as defined in claim 1 and wherein three electrical conductors are supported by said insulator means symmetrically within said carrier rings.

3. A tube-enclosed pressure-gas insulated electrical cable as defined in claim 1 wherein each said leaf spring is secured at its mid-point to said carrier ring and extends in the longitudinal direction of said tube, the end portions of said spring terminating in bearing means in which rollers are mounted.

4. A tube-enclosed pressure-gas insulated electrical cable as defined in claim 1 wherein each said leaf spring is secured at its mid-point to said carrier ring, and the end portions of said spring terminate in bearing means in which rollers are mounted.

5. A tube-enclosed pressure-gas insulated electrical cable as defined in claim 4 wherein the bearing means at the end portions of said leaf spring are constituted by eyelets formed from the spring leaf and in which are mounted axles which support the rollers.

6. A tube-enclosed pressure-gas insulated electrical cable as defined in claim 5 wherein said rollers are located within slotted portions of the eyelets.

7. A tube-enclosed pressure-gas insulated electrical cable as defined in claim 4 wherein each said leaf spring is secured at its mid-point to said carrier ring by means of a clamp which embraces the spring and which includes ears riveted to the carrier ring.

8. A tube-enclosed pressure-gas insulated electrical cable as defined in claim 7 wherein a set pin interconnects said clamp and spring to prevent longitudinal displacement of the spring within the clamp.

9. A tube-enclosed pressure-gas insulated electrical cable as defined in claim 4 wherein each said leaf spring is secured at its mid-point to the inner side of said carrier ring.

* * * * *